United States Patent
Higuchi

(10) Patent No.: US 10,175,868 B2
(45) Date of Patent: *Jan. 8, 2019

(54) MOBILE COMMUNICATION TERMINAL AND TERMINAL OPERATION METHOD

(71) Applicant: KYOCERA CORPORATION, Kyoto (JP)

(72) Inventor: Takeshi Higuchi, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,157

(22) Filed: Mar. 22, 2017

(65) Prior Publication Data

US 2017/0192655 A1     Jul. 6, 2017

Related U.S. Application Data

(63) Continuation of application No. 12/994,660, filed as application No. PCT/JP2009/059797 on May 28, 2009, now Pat. No. 9,621,944.

(30) Foreign Application Priority Data

May 28, 2008 (JP) ................................. 2008-138881

(51) Int. Cl.
*G06F 3/0484* (2013.01)
*G06F 3/0481* (2013.01)
(Continued)

(52) U.S. Cl.
CPC ........ *G06F 3/04845* (2013.01); *G06F 3/0481* (2013.01); *G06F 3/0488* (2013.01);
(Continued)

(58) Field of Classification Search
None
See application file for complete search history.

(56) References Cited

U.S. PATENT DOCUMENTS

| | | | | |
|---|---|---|---|---|
| 7,162,623 B2* | 1/2007 | Yngvesson | ............... | G06T 1/00 345/619 |
| 7,458,014 B1 | 11/2008 | Rubin et al. | | |
| 8,218,171 B2* | 7/2012 | Kubo | ................. | G06Q 30/0633 358/1.13 |
| 8,269,837 B2* | 9/2012 | Shirakawa | ........... | H04N 1/3871 348/207.1 |

(Continued)

FOREIGN PATENT DOCUMENTS

| | | |
|---|---|---|
| JP | 2007-318423 A | 12/2007 |
| JP | 2008-072574 A | 3/2008 |
| KR | 10-2007-0092419 A | 9/2007 |

*Primary Examiner* — Duane N Taylor, Jr.
(74) *Attorney, Agent, or Firm* — Studebaker & Brackett PC

(57) ABSTRACT

An object is to effectively use a surface of a display unit of a mobile communication terminal and to appropriately set a detection area according to display modes, thereby allowing a user to perform an operation easily and intuitively. A mobile communication terminal 110 of the present disclosure includes a display unit 214, a screen control unit 240 that displays a plurality of screens arranged on the display unit, a touch detection unit 218 that receives a user input to a surface of the display unit 214 and a detection area setting unit 242 that, when the plurality of screens are arranged on the display unit 214, sets, as a detection area of the touch detection unit 218 that receives an operation to each of the screens, an area corresponding to either one screen according to sizes of the screens.

15 Claims, 7 Drawing Sheets

(51) Int. Cl.
*G06F 3/0488* (2013.01)
*H04N 5/445* (2011.01)
*H04N 5/45* (2011.01)
*H04N 21/414* (2011.01)
*H04N 21/422* (2011.01)
*H04N 21/431* (2011.01)
*H04N 21/485* (2011.01)
*H04M 1/02* (2006.01)

(52) U.S. Cl.
CPC ........... *H04N 5/44591* (2013.01); *H04N 5/45* (2013.01); *H04N 21/41407* (2013.01); *H04N 21/422* (2013.01); *H04N 21/4312* (2013.01); *H04N 21/4314* (2013.01); *H04N 21/4858* (2013.01); *G06F 2203/04803* (2013.01); *H04M 1/0235* (2013.01); *H04M 2250/22* (2013.01)

(56) References Cited

U.S. PATENT DOCUMENTS

| | | | |
|---|---|---|---|
| 8,339,420 B2 * | 12/2012 | Hiraoka | G06T 3/40 345/660 |
| 2004/0150659 A1 * | 8/2004 | Nakano | G06F 3/14 345/629 |
| 2005/0158015 A1 * | 7/2005 | Nakayama | G11B 27/034 386/241 |
| 2006/0109517 A1 | 5/2006 | Catalan | |
| 2007/0097088 A1 * | 5/2007 | Battles | G06F 3/03547 345/173 |
| 2008/0158189 A1 | 7/2008 | Kim | |
| 2008/0189608 A1 | 8/2008 | Nurmi | |
| 2008/0204402 A1 | 8/2008 | Hirata et al. | |
| 2009/0100462 A1 | 4/2009 | Park et al. | |

* cited by examiner

MOBILE COMMUNICATION TERMINAL AND TERMINAL OPERATION METHOD

CROSS REFERENCE TO RELATED APPLICATIONS

This application is a Continuation Application of U.S. patent application Ser. No. 12/994,660 filed Nov. 24, 2010, which is the U.S. National Phase Application of International Application No. PCT/JP2009/059797, filed May 28, 2009, which claims benefit of Japanese Patent Application No. 2008-138881 filed May 28, 2008, the entire contents of which are incorporated herein by reference.

TECHNICAL FIELD

The present disclosure relates to a mobile communication terminal capable of displaying a plurality of screens and a terminal operation method.

BACKGROUND ART

Regarding the terrestrial digital broadcasting since December, 2003, the coverage area has been expanded on a national scale and the users have also increased as the end of the conventional terrestrial analog broadcasting approaches. The terrestrial digital broadcasting is a broadcasting way of transmitting broadcasting signals through radio waves having 13 segments including 12 segments for fixed television receiver and one segment for mobile communication terminal (hereinafter, referred to as one segment broadcasting) by OFDM (Orthogonal Frequency Division Multiplex), and can receive images and sounds of higher quality, in which ghost and noise are suppressed, compared to the terrestrial analog broadcasting.

The one segment broadcasting can be watched anytime and anywhere by a mobile communication terminal such as mobile telephone and PHS (Personal Handy phone System), and a new usage utilizing its portability is being studied.

In the mobile communication terminal, when watching the one segment broadcasting, a user operates, for example, a dial push button of the mobile communication terminal to select a program channel, like a remote controller. That is, the user can operate operation keys, which corresponds to respective broadcasting stations or perform the operation through an application-dedicated menu, thereby watching a desired program.

SUMMARY

A communication terminal according to the present disclosure comprises a display that displays at least a first image and a second image adjacent to the first image; a touch detector that receives a user input on a surface of the display; and a controller including a processor communicatively coupled to memory containing instructions, the processor executing the instructions to control the display and to display the first image and the second image simultaneously on the display and to change the sizes of the first image and the second image relative to one another. With the second image smaller than the first image, the controller controls display of the first image if the touch detector receives a user input on an area of the second image on the display, and with the first image smaller than the second image, the controller controls the display of the second image if the touch detector receives a user input on an area of the first image on the display, and the controlling of the display of the first image and the controlling of the display of the second image is switched with a user input to change the relative sizes of the first and second images.

A communication terminal according to another aspect of the disclosure comprises a processor; and memory communicatively coupled to the processor and containing instructions that when executed by the processor cause the processor to: display on a display including a touch detector that receives a user input on a surface of the display at least a first image and a second image adjacent to the first image; with the second image smaller than the first image, control the display of the first image if a user input on an area of the second image on the display; with the first image smaller than the second image, control the display of the second image if the touch detector receives a user input on an area of the first image on the display; and switch between control of the display of the first image and control of the display of the second image with a user input to change the relative sizes of the first and second images.

A communication terminal according to yet another aspect of the disclosure comprises a display that displays at least a first image and a second image adjacent to the first image on a display; a processor communicatively coupled to memory containing instructions, the processor executing the instructions to set one of a first mode, a second mode, and a third mode, and the processor operable to: set the first mode, operable to set the second mode, and operable to set the third mode, wherein in the first mode, the first image and the second image are displayed at substantially a same size, in the second mode, a size of the second image is smaller than a size of the first image, and in the third mode, the size of the first image is smaller than the size of the second image; control display of the first image if a user inputs on an area of the second image in the second mode; and control display of the second image if a user inputs on an area of the first image in the third mode. A transition from the second mode to the third mode causes the processor to switch from control of display of the first image to control of display of the second image, and a transition from the third mode to the second mode causes the processor to switch from control of display of the second image to control of display of the first image, and one of the transitions between the second and third modes changes with a change in the relative size of the first and second images.

EFFECTS OF THE DISCLOSURE

As described above, according to the present disclosure, it is possible to effectively use a surface of a display.

DETAILED DESCRIPTION OF EMBODIMENTS

Figure 1:
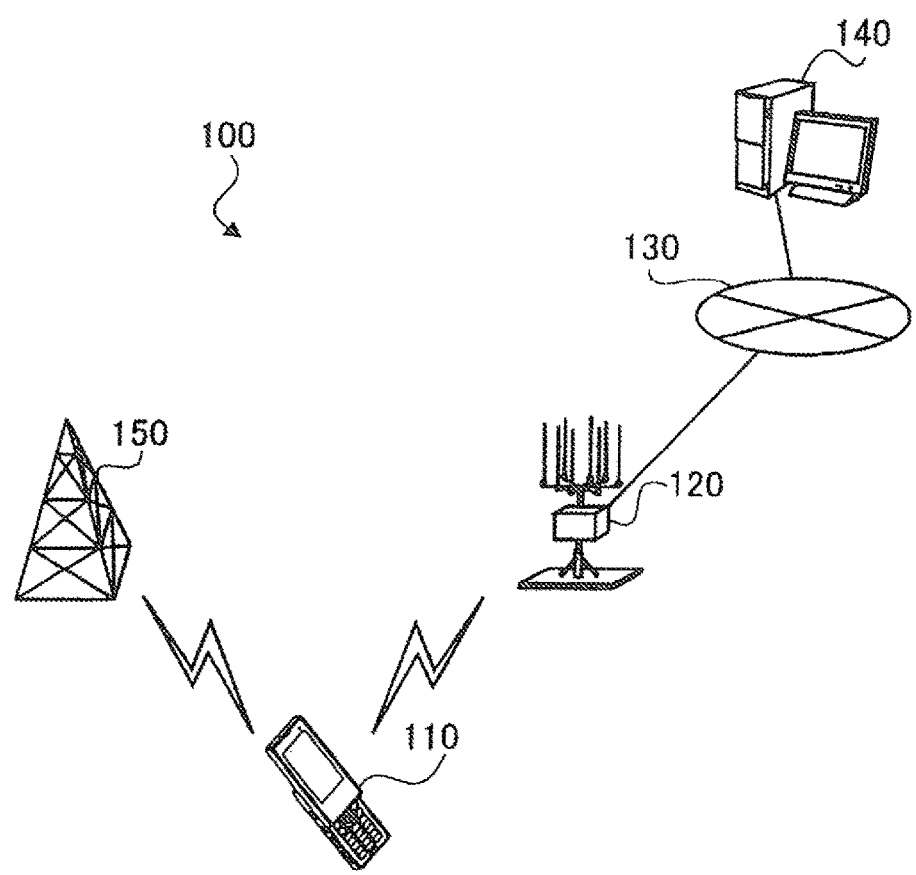
FIG. 1 is an explanation diagram showing a schematic connection relationship in a wireless communication system.

Hereinafter, preferred embodiments of the present disclosure will be described in detail with reference to the drawings. The sizes, materials, specific numerical values and the like described in the embodiments are just exemplary so as to easily understand the present disclosure, and are not to limit the disclosure, unless particularly otherwise mentioned. Further, in the specification and the drawings, the elements having the substantially same function and configuration will be designated with the same reference numerals and the overlapped descriptions thereof will be omitted. In addition, the elements that are not directly related to the disclosure will not be shown.

(Wireless Communication System 100)

FIG. 1 is an explanation diagram showing a schematic connection relationship in a wireless communication system 100. The wireless communication system 100 includes a mobile communication terminal 110, a base station 120 that serves as an access point of the mobile communication terminal 110, a communication network 130 that is connected to the base station 120 and is configured by an ISDN (Integrated Services Digital Network) line, the Internet, a dedicated line or the like, a video distribution server 140 that is connected to the communication network 130 and a broadcasting station 150 that transmits terrestrial digital broadcasting.

In the wireless communication system 100, the mobile communication terminal 110 can perform a phone call or communication with another mobile communication terminal 110 through the base station 120 and can receive video distribution such as streaming from the video distribution server 140 through the communication network 130. In addition, the mobile communication terminal 110 further includes a tuner that receives one segment broadcasting, as a wireless device, so that a user can watch a television program. This embodiment has an object of effectively using a surface of a display unit of the mobile communication terminal 110 and appropriately setting a detection area according to display modes to allow a user to perform an operation easily and intuitively. Hereinafter, a specific configuration of the mobile communication terminal 100 will be described and an operation thereof will be described as a terminal operation method.

(Mobile Communication Terminal 110)

Figure 2:
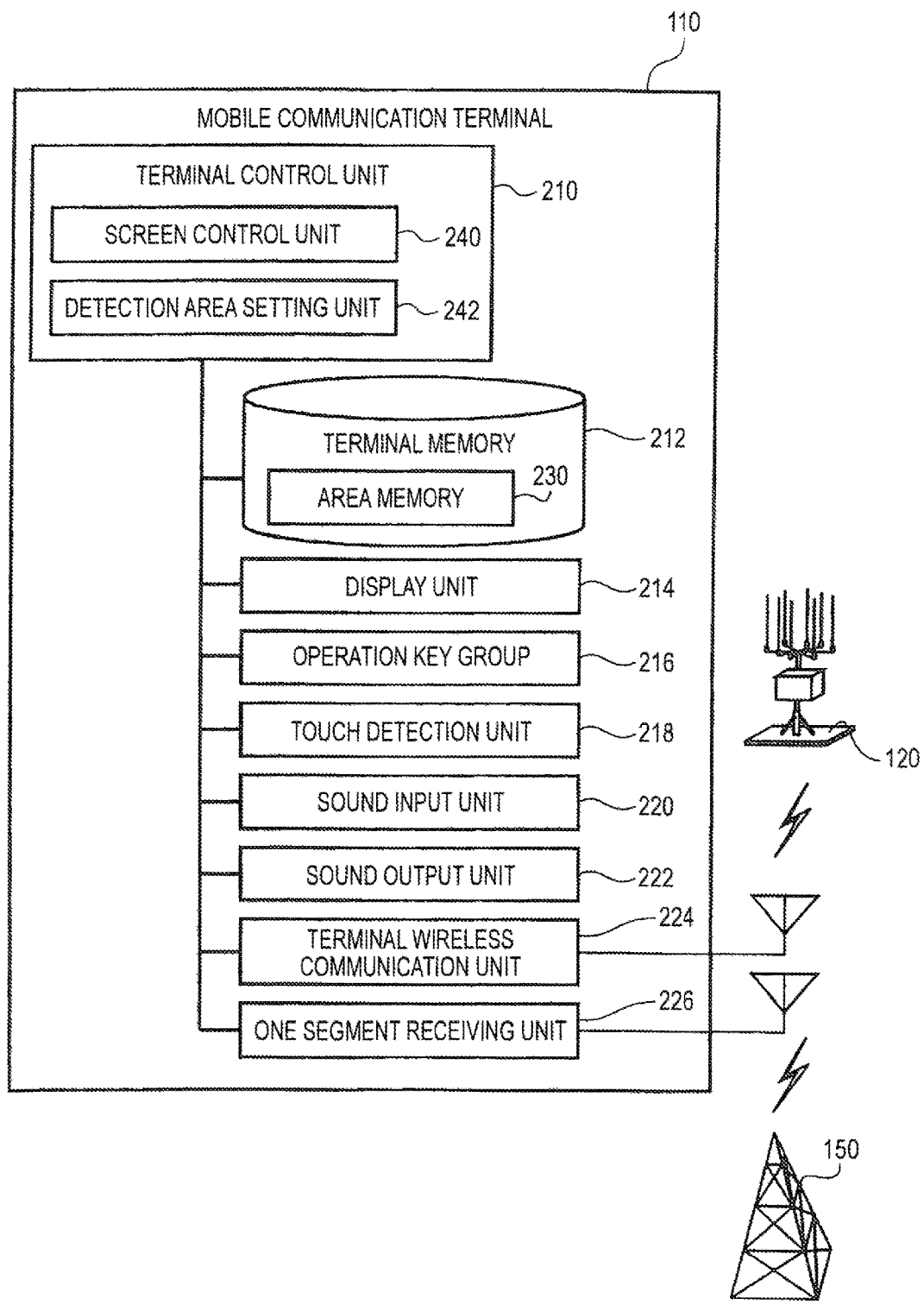
FIG. 2 is a functional block diagram showing a hardware configuration of a mobile communication terminal.
Figure 3:
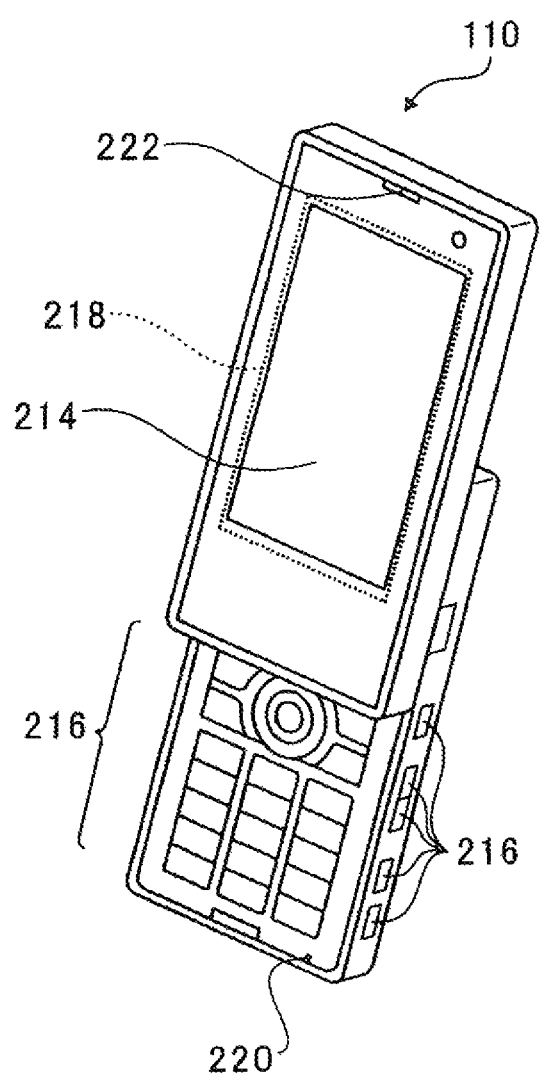
FIG. 3 is a perspective view showing an outer appearance of the mobile communication terminal.

FIG. 2 is a functional block diagram showing a hardware configuration of the mobile communication terminal 110, and FIG. 3 is a perspective view showing an outer appearance of the mobile communication terminal 110. The mobile communication terminal 110 includes a terminal control unit 210, a terminal memory 212, a display unit 214, an operation key group 216, a touch detection unit 218, a sound input unit 220, a sound output unit 222, a terminal wireless communication unit 224 and a one segment receiving unit 226.

As the mobile communication terminal 110, a variety of electronic devices capable of performing wireless communication may be used such as a mobile telephone, a PHS terminal, a notebook computer, a PDA (Personal Digital Assistant), a digital camera, a music player, a car navigation, a gaming device, a DVD player and the like.

The terminal control unit 210 manages and controls the mobile communication terminal 110 by a semiconductor integrated circuit including a central processing unit (CPU). In addition, the terminal control unit 210 uses programs in the terminal memory 212 to realize a communication function, mail transmitting and receiving functions, an imaging function, a music playing function and a TV watching function. The terminal memory 212 is configured by a ROM, a RAN, an EEPROM, a non-volatile RAM, a flash memory, an HDD or the like. The terminal memory 212 stores programs, communication data and the like, which are processed in the terminal control unit 210. In addition, the terminal memory 212 serves as an area storage unit 230 that stores an area state of a screen.

The display unit 214 is configured by a liquid crystal display, EL (Electro Luminescence) display or the like. The display unit 214 can display images of the one segment broadcasting that is received in the one segment receiving unit 226. In addition, the display unit 214 can display video data, which is stored in the terminal memory 212 or provided from the video distribution server 140 through the communication network 130, web contents provided from another web server, a GUI (Graphical User Interface) of an application, and the like.

The operation key group 216 includes a keyboard, cross keys, a movable switch such as joystick and the like and receives an operation input of a user.

The touch detection unit 218 receives an operation input of a user corresponding to a display on a surface of the display unit 214. As the detection method of the touch detection unit 218, there may be used the conventional methods such as a resistance film method (pressure-sensitive method), an electrostatic capacity method, an infrared light-shielding method, an ultrasonic surface acoustic wave method, an electromagnetic induction method, an electrostatic coupling method, an acoustic pulse recognition method, an image recognition method and the like. In addition, a method of recognizing an object placed on the surface of the display unit by an optical sensor integrated to the display unit 214 is also within the technical scope of this embodiment.

By the touch detection unit 218, it is possible to receive a user's intuitive input according to the screen of the display unit 214 without using the operation key group 216, for example. In addition, by the touch detection unit 218, it is possible to perform analog operations such as scrolling and pointing of the web contents displayed on the display unit 214.

The sound input unit 220 is configured by sound recognition means such as microphone and the like and converts user sound, which is input in making a call, into an electric signal that can be processed in the mobile communication terminal 110. The sound output unit 222 is configured by a speaker and converts and outputs a sound signal of a calling counterpart, which is received in the mobile communication terminal 110, into sound. In addition, the sound output unit 222 can also output a ringtone, an operating sound of the operation key group 216 or touch detection unit 218, an alarm sound and the like.

The terminal wireless communication unit 224 establishes wireless communication with the base station 120 in a wireless communication method such as CDMA (Code Division Multiple Access) and WiMAX (Worldwide Interoperability for Microwave Access) and performs voice communication with a communication counterpart or data communication with a web server. In addition, the terminal wireless communication unit 224 of this embodiment can receive a video distribution, such as streaming which playing video data and sound data while receiving the video data and the sound data from the video distribution server 140. The one segment receiving unit 226 can receive one segment broadcasting. As users of the one segment broadcasting increase, needs of mounting a plurality of tuners for one segment broadcasting and watching a plurality of television programs at the same time has occurred. Particularly, in this embodiment, there is provided with two tuners of receiving the one segment broadcasting to independently receive two television programs, thereby satisfying the needs.

Further, the terminal control unit 210 serves as a screen control unit 240 and a detection area setting unit 242.

The screen control unit 240 controls an image that is output to the display unit 214. For example, when there is a plurality of images to be displayed, the screen control unit can divide the display unit 214 into a plurality of areas and independently arrange a plurality of screens, for example one segment broadcastings or video data such as streaming, in the respective areas. The images that are displayed on the plurality of screens of the display unit 214 may be images of each page of an electronic book, a plurality of still images and the like. Additionally, the screen control unit 240 controls switching of the images to be displayed on the screens of the display unit 214. For example, when one segment broadcastings are received, the screen control unit 240 controls channel switching of the one segment broadcastings to switch the images to be displayed on the screens of the display unit 214. In addition, the screen control unit 240 controls channel switching of the video distribution such as streaming distributed from the video distribution server 140 through the communication network 130, thereby switching the images to be displayed on the screens of the display unit 214. Further, as the control of the channel switching, the screen control unit 240 may switch the images to be displayed on the screens of the display unit 214 so that the images are switched as turning over of the pages of the electronic book. Alternatively, the screen control unit 240 may perform the control so that the still images are frame-advanced, thereby switching the still images to be displayed on the screens of the display unit 214.

Figure 4:
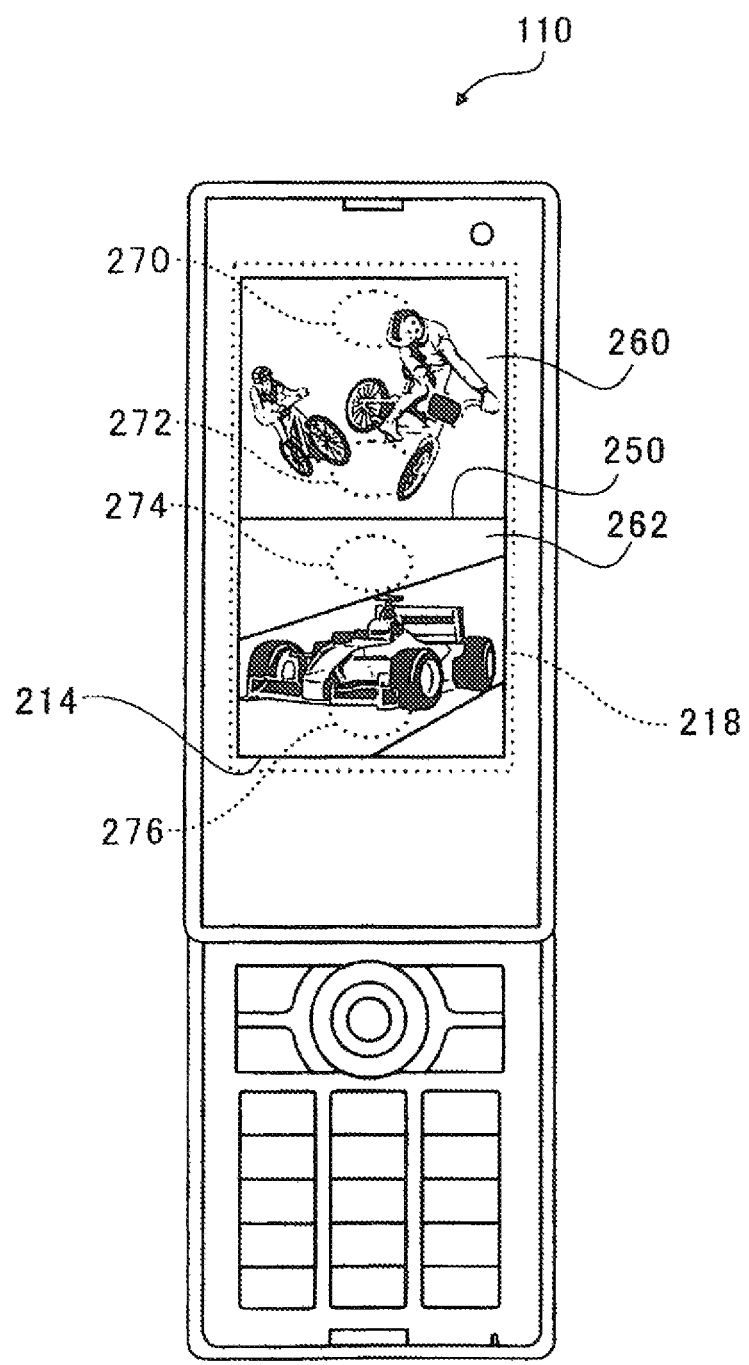
FIG. 4 is a diagram showing an example of a screen display by a screen control unit.

FIG. 4 is a diagram showing an example of a screen display by the screen control unit 240. In FIG. 4, the display unit 214 is equally divided into two screens 260, 262 by a boundary line 250 and television programs of different channels are displayed on the respective screens.

When a plurality of screens are arranged with equal sizes on the display unit 214, the detection area setting unit 242 sets, as a detection area of the touch detection unit 218 that receives an operation to an application corresponding to each of the screens, an area corresponding to (overlapped with) each of the screens. In the example of FIG. 4, when surfaces of the two-divided screens 260, 262 are touched with a finger, it is possible to operate applications corresponding to the respective areas. In particular, regarding the screen 260, when a central upper area 270 of the screen 260 is touched, the channel of the one segment broadcasting displayed on the screen 260 is incremented and when a central lower area 272 is touched, the channel is decremented. Also regarding the screen 262, it is possible to perform the same operations by touching a central upper area 274 and a central lower area 276.

At this time, a user can enlarge a desired screen of the plurality of screens through the touch detection unit 218.

Figure 5:
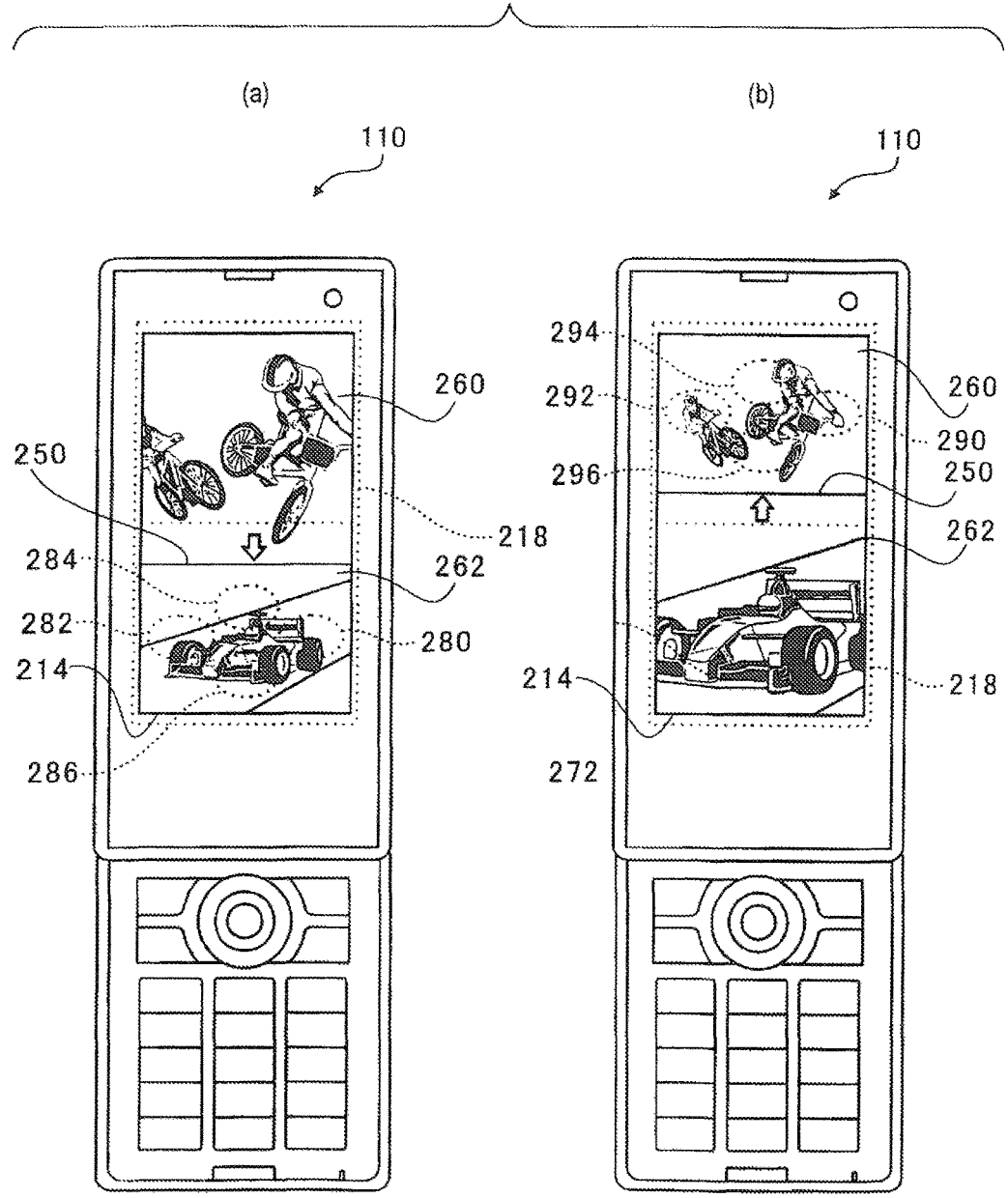
FIG. 5 is a diagram showing another example of a screen display by the screen control unit.

FIG. 5 is a diagram showing another example of a screen display by the screen control unit 240. Particularly, FIG. 5(a) shows an example of enlarging the screen 260 and FIG. 5(b) shows an example of enlarging the screen 262. In FIG. 5(a), when a user moves the boundary line 250 in a downward direction of the display unit 214 with a finger, as shown with an arrow, the screen 260 is enlarged and the screen 262 is correspondingly reduced. Accordingly, it is possible to enlarge and watch the desired screen 260.

Here, the detection area setting unit 242 sets, as a detection area of the touch detection unit 218 that receives an operation to an application corresponding to each of the screens of the display unit 215, an area corresponding to either one screen in accordance with sizes of the screens after the boundary line 250 is changed through the touch detection unit 218 or a position of the boundary line 250. In the example of FIG. 5(a), a screen having a low priority in a ratio of screens, for example an area overlapped with the reduced screen 262 is set as the detection area, and an operation to an application corresponding to the screen 260 is performed from the touch detection unit 218 in the screen 262.

Specifically, in the mobile communication terminal 110, for example, when a right side area 280 of the screen 262 is touched, the channel of one segment broadcasting displayed on the screen 260 is incremented, and when a left side area 282 is touched, the channel is decremented. Further, in the mobile communication terminal 110, when an upper area 284 of the screen 262 is touched, the channel of one segment broadcasting displayed on the screen 262 itself is incremented and when a lower area 286 is touched, the channel is decremented.

That is, in the mobile communication terminal 110, the channel switching of the two screens 260, 262 can be allotted to one screen 262 and the detection area set in the detection area setting unit 242 can be input through at least two independent routes, such as upper and lower and left and right sides, so that it is possible to operate the plurality of screens effectively and intuitively. Further, in the mobile communication terminal 110, the channel switching of the enlarged screen 260 is allotted to the right and left areas 280, 282 that have large occupying areas and are easily discernible due to spaced distance thereof, so that a favorable operability for the enlarged main screen 260 is held.

Herein, the embodiment has been described in which the detection area setting unit 242 sets the detection areas in the reduced screen 262. However, the present disclosure is not limited thereto. For example, the detection areas may be provided on the enlarged screen 260.

Further, when the screen 262 is enlarged as shown in FIG. 5(b), the detection areas are set correspondingly to the screen 260 and the operation inputs of upper and lower and left and right sides (inputs on areas 290, 292, 294, 296 of the screen 260) are possible, similarly to the example of FIG. 5(a). However, in FIG. 5(b), the enlarged screen 262 is switched by the operation to the left and right side areas 292, 290 and the reduced area 260 is switched by the operation to the upper and lower areas 294, 296.

The screen control unit 240 also changes one or more of resolutions, sizes and arrangements of images to be displayed, in accordance with the display areas of the respective screens.

Accordingly, the mobile communication terminal 110 can optimize the display of the respective screens on the display areas changed by the touch detection unit 218 by performing the enlargement and reduction of resolution, the change of size (screen size) and the change of arrangements of data broadcasting and the like.

Figure 6:
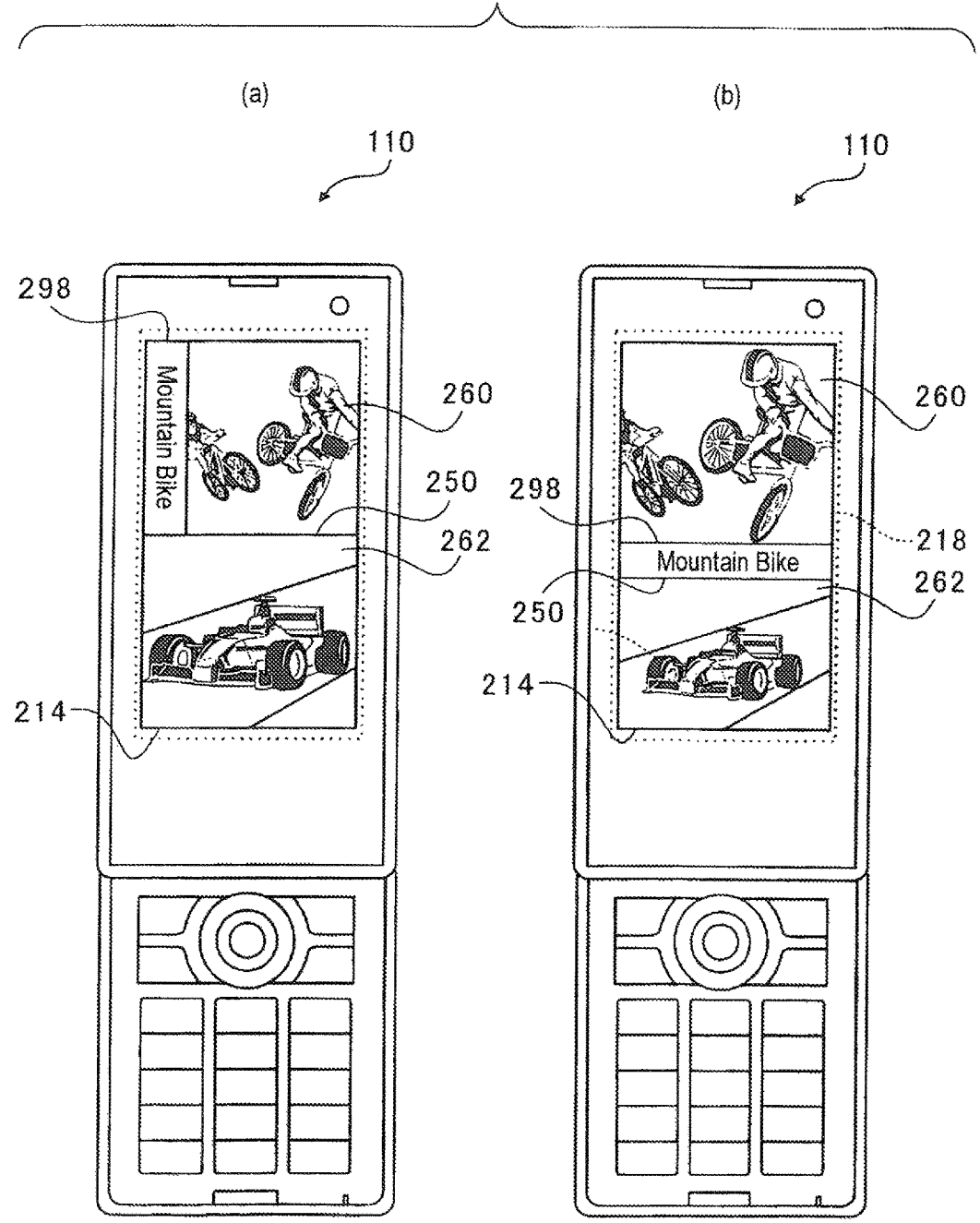
FIG. 6 is a diagram showing an example of a screen display enlarged by the screen control unit.

FIG. 6 is a diagram showing an example of a screen display enlarged by the screen control unit 240. In particular, FIG. 6(a) shows an example of equally dividing the display unit 214 and FIG. 6(b) shows an example of enlarging one screen 260. In FIG. 6(a), the screen 260 is enlarged, the resolution and size (screen size) thereof are enlarged and a display position 298 of data broadcasting is also changed. By the optimization of the display area, a user can watch a desired television program with a screen that is appropriately enlarged and has an aspect ratio, which does not cause a sense of incompatibility.

In addition, when the user wants to further enlarge the screen 260 and thus reverses an aspect ratio of the screen 260, the screen control unit 240 changes the display direction of one segment broadcasting by 90° to widthwise arrange the display unit 214.

Further, when the mobile communication terminal 110 starts up, the screen control unit 240 refers to an area memory 230 to start the display at the same area state as a value of the previous times. Accordingly, the mobile communication terminal 110 can restart from the screen state at which the mobile communication terminal 110 of the previous times is turned off, so that it can form an optimized display state without re-executing the same setting process as the previous times.

According to the mobile communication terminal 110 configured as described above, it is possible to effectively use the surface of the display unit 214 without enlarging the mobile communication terminal 110 and to appropriately set a detection area according to display modes, thereby allowing a user to perform an operation easily and intuitively.

(Terminal Operation Method)

Hereinafter, a terminal operation method of operating the mobile communication terminal 110 will be described.

Figure 7:
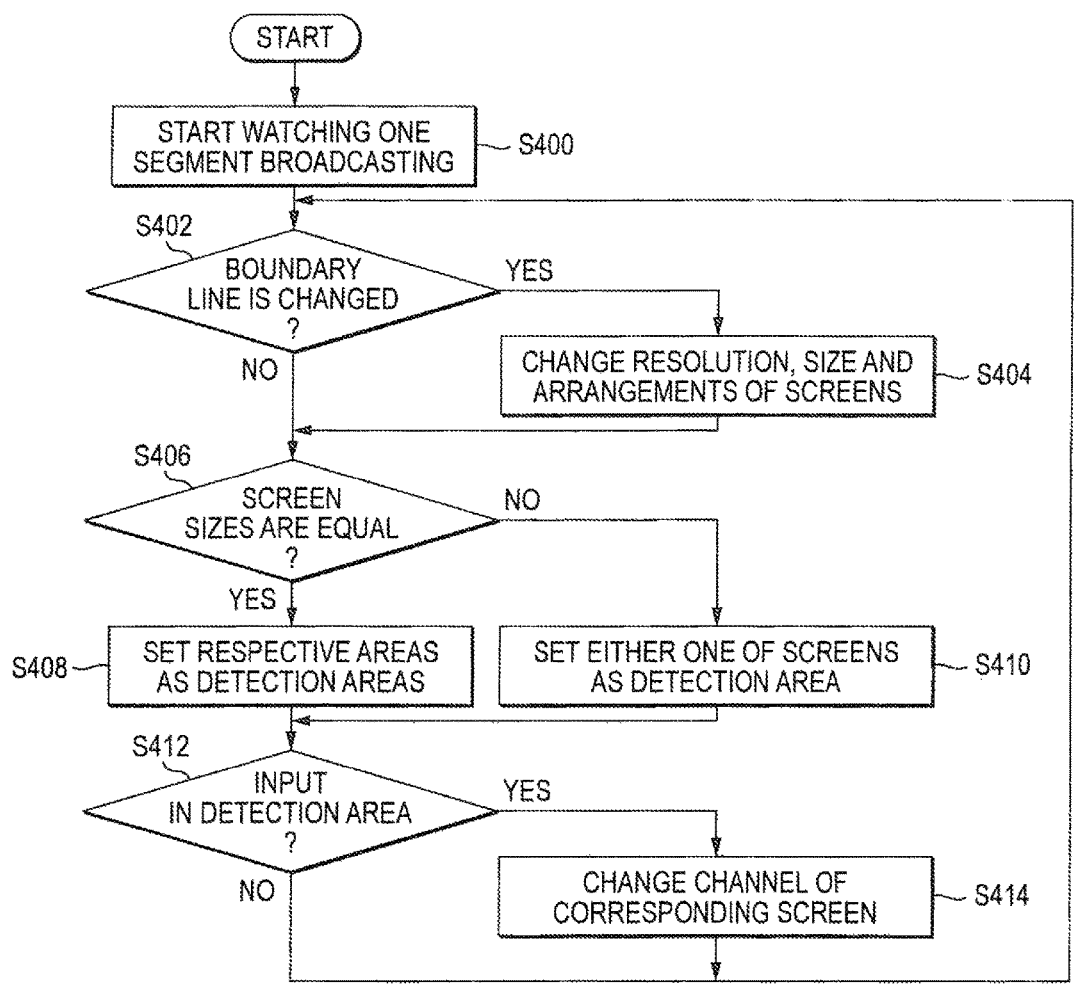
FIG. 7 is a flow chart showing a general procedure of a terminal operation method.

FIG. 7 is a flow chart showing a general procedure of a terminal operation method. When a user wants to watch one segment broadcasting with the mobile communication terminal 110, the one segment receiving unit 226 receives and displays one segment broadcasting on the display unit 214 (S400). At this time, the one segment receiving unit 226 can display two television programs on the display unit through two tuners, respectively, at the same time.

The user can change a ratio of two screens through the touch detection unit 218 so as to easily watch the two television programs. When the mobile communication terminal 110 detects the change of the boundary line 250 by the touch detection unit 218 (S402), the mobile communication terminal changes resolutions, sizes and arrangements of the two screens, based on the detection (S404).

At this time, it is determined whether the two screens are equally divided (S406). When the two screens are equally divided, the detection area setting unit 242 sets, as a detection area of the touch detection unit 218 that receives an operation to an application corresponding to each of the screens, an area corresponding to (overlapped with) each of the screens (S408). When the two screens are not equally divided, the detection area setting unit 242 sets, as a detection area of the touch detection unit 218 that receives an operation to an application corresponding to each of the screens of the display unit 215, an area corresponding to either one screen in accordance with sizes of the two screens or a position of the boundary line 250 (S410).

When the user further inputs in the detection areas set by the detection area setting unit 242 (S412), for example when the sizes of the two screens are not equal and the user touches (clicks) one of left and right sides of the one screen set as the detection area, a channel of the other screen is changed (S414). Then, the above processes are repeated.

With the above terminal operation method, it is possible to allow a user to perform an operation easily and intuitively by appropriately setting the detection area according to the display aspects of the mobile communication terminal 110.

In the mobile communication terminal 110 of this embodiment, it is possible to change the ratio of screens in conjunction with the setting of the detection area, thereby allowing a user to perform an operation easily and intuitively, similarly to the setting in accordance with the sizes of the screens.

In a mobile communication terminal, it is typically complicated to perform an operation in order to watch a television program, compared to a dedicated television apparatus. In addition, operation keys and sequences are different for each of mobile communication terminals and it takes time to become accustomed to the operation. However, according to the mobile communication terminal 110 of this embodiment, it is possible to enlarge a desired one screen of the plurality of screens through the touch detection unit 218 and to set, as a detection area, a screen having a low priority in a ratio of screens, for example a reduced area. That is, according to this embodiment, it is possible to change the ratio of screens in conjunction with the setting of the detection area, thereby allowing a user to perform an operation easily and intuitively.

According to the mobile communication terminal 110 of this embodiment, the screen control unit 240 displays the video distribution, the channel of which can be switched. Thereby, it is possible to switch the channel of the video distribution by an intuitive operation of contacting a position opposed to the detection area set in the detection area setting unit 242, for example.

According to the mobile communication terminal 110 of this embodiment, the channel switching of the screens is allotted to the operation inputs to upper and lower and left and right sides, respectively, in the set detection area. Therefore, it is possible to make input in the detection area set by the detection area setting unit 242 with at least two independent systems, such as upper and lower sides and left and right sides, so that it is possible to operate the plurality of screens effectively and intuitively.

The mobile communication terminal 110 of this embodiment has the area memory 230 that stores the area states of the screens, and when the mobile communication terminal 110 starts up, the screen control unit 240 refers to the area memory 230 to start the display at the same area state as a value of the previous times. Therefore, the mobile communication terminal can restart from the screen state at which the mobile communication terminal 110 of the previous times is turned off, so that it can form an optimized display state without re-executing the same setting process as the previous times.

In addition, the one segment receiving unit 226 may be a broadcasting receiving unit, for example. In this case, the mobile communication terminal 110 may receive broadcastings through the broadcasting receiving unit and the screen control unit 240 may display the broadcasting on the screens at the same area state as values of the previous times in receiving the broadcastings.

Although the preferred embodiments of the present disclosure have been described, it should be noted that the present disclosure is not limited thereto and can be modified and changed by one skilled in the art within the scope of the claims, which are intended to be included in the technical scope of the present disclosure.

For example, in the above embodiments, the display unit 214 is divided into two screens. However, the embodiments can be applied to a case where the display unit is divided into three or more screens.

The respective processes of the terminal operation method are not necessarily performed time-serially in accordance with the procedures shown in the flow chart and may be performed in parallel or include processing by a subroutine.

INDUSTRIAL APPLICABILITY

The present disclosure can be used in a mobile communication terminal capable of displaying a plurality of screens and a terminal operation method.

DESCRIPTIONS OF REFERENCE NUMERALS

110: mobile communication terminal
214: display unit
218: touch detection unit
230: area memory
240: screen control unit
242: detection area setting unit
250: boundary line

The invention claimed is:

1. A communication terminal comprising:
a display that displays at least a first image and a second image adjacent to the first image;
a touch detector that receives a user input on a surface of the display; and
a controller including a processor communicatively coupled to memory containing instructions, the processor executing the instructions to control the display and to display the first image and the second image simultaneously on the display and to change the sizes of the first image and the second image relative to one another, wherein
with the second image smaller than the first image, the controller controls display of the first image if the touch detector receives a user input on an area of the second image on the display, and
with the first image smaller than the second image, the controller controls the display of the second image if the touch detector receives a user input on an area of the first image on the display, and
the controlling of the display of the first image and the controlling of the display of the second image is switched with a user input to change the relative sizes of the first and second images.

2. The communication terminal according to claim 1, wherein
the controller sets an area for the user input in the first and second images according to the respective size of the first and second images.

3. The communication terminal according to claim 1, wherein
the first image and the second image are not overlapping each other.

4. The communication terminal according to claim 1, wherein
switching to controlling of the display of the first image occurs with a change to make the second image smaller than the first image, and
switching to controlling of the display of the second image occurs with a change to make the first image smaller than the second image.

5. The communication terminal according to claim 1, wherein
a portion of the second image is displayed in a same area of the display before and after switching between controlling of the display of the first image and controlling of the display of the second image.

6. A communication terminal comprising:
a processor; and
memory communicatively coupled to the processor and containing instructions that when executed by the processor cause the processor to:
display on a display including a touch detector that receives a user input on a surface of the display at least a first image and a second image adjacent to the first image;
with the second image smaller than the first image, control the display of the first image if a user input on an area of the second image on the display;
with the first image smaller than the second image, control the display of the second image if the touch detector receives a user input on an area of the first image on the display; and
switch between control of the display of the first image and control of the display of the second image with a user input to change the relative sizes of the first and second images.

7. The communication terminal according to claim 6, wherein
the processor sets an area for the user input in the first and second images according to the respective size of the first and second images.

8. The communication terminal according to claim 6, wherein
the first image and the second image are not overlapping each other.

9. The communication terminal according to claim 6, wherein
the switch to control the display of the first image occurs with a change to make the second image smaller than the first image, and
the switch to control the display of the second image occurs with a change to make the first image smaller than the second image.

10. The communication terminal according to claim 6, wherein
a portion of the second image is displayed in a same area of the display before and after the switching between controlling of the display of the first image and controlling of the display of the second image.

11. A communication terminal comprising:
a display that displays at least a first image and a second image adjacent to the first image on a display;
a processor communicatively coupled to memory containing instructions, the processor executing the instructions to set one of a first mode, a second mode, and a third mode, and the processor operable to:
set the first mode, operable to set the second mode, and operable to set the third mode, wherein
in the first mode, the first image and the second image are displayed at substantially a same size,
in the second mode, a size of the second image is smaller than a size of the first image, and
in the third mode, the size of the first image is smaller than the size of the second image;
control display of the first image if a user inputs on an area of the second image in the second mode; and
control display of the second image if a user inputs on an area of the first image in the third mode, wherein
a transition from the second mode to the third mode causes the processor to switch from control of display of the first image to control of display of the second image, and a transition from the third mode to the second mode causes the processor to switch from control of display of the second image to control of display of the first image, and one of the transitions between the second and third modes changes with a change in the relative size of the first and second images.

12. The communication terminal according to claim 11, wherein the processor is operable to set an area for the user input in the first and second images according to the respective size of the first and second images.

13. The communication terminal according to claim 11, wherein the first image and the second image are not overlapping each other, and the second image of the second mode is displayed at a size smaller than the size of the second image of the first mode.

14. The communication terminal according to claim 11, wherein the switch to control the display of the first image occurs with a change to make the second image smaller than the first image, and the switch to control the display of the second image occurs with a change to make the first image smaller than the second image.

15. The communication terminal according to claim 11, wherein a portion of the second image of the second mode and a portion of the second image of the third mode are displayed in a same area of the display.

* * * * *